United States Patent
Smithers et al.

(10) Patent No.: US 10,451,474 B2
(45) Date of Patent: Oct. 22, 2019

(54) METHOD AND APPARATUS FOR DETERMINING MOTOR OPERATION STATES

(71) Applicant: Redtail Telematics Limited, Essex (GB)

(72) Inventors: Colin Smithers, Bishop's Stortford (GB); Kevin Jones, Haverhill (GB); Gareth Jones, Cambridge (GB)

(73) Assignee: Redtail Telematics Limited, Essex (GB)

( * ) Notice: Subject to any disclaimer, the term of this patent is extended or adjusted under 35 U.S.C. 154(b) by 0 days.

(21) Appl. No.: 14/626,610

(22) Filed: Feb. 19, 2015

(65) Prior Publication Data
US 2015/0160070 A1 Jun. 11, 2015

Related U.S. Application Data

(63) Continuation of application No. PCT/GB2013/052232, filed on Aug. 23, 2013.

(30) Foreign Application Priority Data

Aug. 23, 2012 (GB) .................................. 1215071.0

(51) Int. Cl.
G01L 3/00 (2006.01)
G01H 1/00 (2006.01)
F02D 35/02 (2006.01)
G01M 15/00 (2006.01)

(52) U.S. Cl.
CPC ............. *G01H 1/003* (2013.01); *F02D 35/02* (2013.01); *G01M 15/00* (2013.01)

(58) Field of Classification Search
CPC .. G01H 1/003; G01M 13/028; G01M 13/045; G01M 7/00
USPC .......................................................... 702/56
See application file for complete search history.

(56) References Cited

U.S. PATENT DOCUMENTS 5,566,092 A    10/1996  Wang et al.
5,571,969 A *  11/1996  Kawasaki ........................ 73/649
6,256,545 B1 *  7/2001  Kimura ................... F16F 13/26
                                                   381/71.4

(Continued)

FOREIGN PATENT DOCUMENTS

EP          0529786 A2      3/1993
JP          06-300826    *  10/1994

(Continued)

OTHER PUBLICATIONS

English translation of JP 06-300826, dated Oct. 1994.*

(Continued)

*Primary Examiner* — Michael P Nghiem
(74) *Attorney, Agent, or Firm* — EIP US LLP

(57) ABSTRACT

An apparatus and method for determining an operational state of a motor are described. The apparatus includes a sensor or detecting vibration and a processor coupled to the sensor. The processor converts sensed vibration signals into the frequency domain to produce a vibration characteristic, and determines a current operational state of the motor based on the vibration characteristic, wherein the current operation state is determined from at least two different operational states including at least one idle state and at least one working state.

16 Claims, 7 Drawing Sheets

(56) References Cited

U.S. PATENT DOCUMENTS

| | | | |
|---|---|---|---|
| 6,289,735 B1* | 9/2001 | Dister et al. | 73/579 |
| 2016/0103038 A1* | 4/2016 | Lacaille | G01M 15/12 |
| | | | 73/114.07 |
| 2016/0103042 A1* | 4/2016 | Kao | G01M 7/00 |
| | | | 702/56 |

FOREIGN PATENT DOCUMENTS

| | | |
|---|---|---|
| JP | 2005250985 A2 | 9/2005 |
| JP | 2009191820 A2 | 8/2009 |
| WO | 2002045407 A2 | 6/2002 |
| WO | 2005080779 A1 | 9/2005 |
| WO | 2010013663 A1 | 2/2010 |

OTHER PUBLICATIONS

International Search Report and Written Opinion dated Jan. 27, 2014 on related application PCT/GB2013/052232 dated Aug. 23, 2013.

* cited by examiner

METHOD AND APPARATUS FOR DETERMINING MOTOR OPERATION STATES

CROSS-REFERENCE TO RELATED APPLICATIONS

This application is a continuation under 35 U.S.C. § 120 of International Application No. PCT/GB2013/052232, filed Aug. 23, 2013 (published by the International Bureau as International Publication No. WO/2014/030013 on Feb. 27, 2014), which claims priority to United Kingdom Patent Application No. GB 1215071.0, filed Aug. 23, 2012. The entire contents of each of the above-referenced applications are hereby incorporated by reference.

BACKGROUND OF THE INVENTION

Field of the Invention

The present application relates to a method and apparatus for determining motor operation states using detected vibrations.

Description of the Related Technology

Energy costs, such as fuel costs, are a major component of the operating cost of a motor. A proportion of energy costs are due to the motor being in an idle state, where the motor is on but not in use for work.

When a motor is used to provide motive power to equipment a working state of the motor can be identified by detecting vehicle motion. For example, a tracking device may contain a GPS receiver to determine the equipment location and the GPS can be used to detect motion through changes in the location. A motion sensor can also be used to detect motion of equipment. However, while this can identify that the motor is working, stationary equipment does not necessarily mean that the motor is idle. For example, the motor may still be working while the equipment remains in substantially the same position. Examples include motors in construction and agricultural machinery, which may be working while the machinery is stationary. To give some examples, chippers, hole borers, back hoe loaders, asphalt layers, vibrating road rollers, air compressors and excavators may all remain stationary while their motors are working to carry out the machinery's function.

SUMMARY

In one embodiment, an apparatus for fixation to equipment containing a motor and for determining an operational state of the motor is provided. The apparatus comprises a sensor for detecting vibration; and a processor coupled to the sensor. The processor is configured to convert sensed vibration signals into the frequency domain to produce a vibration characteristic, and determine a current operational state of the motor based on the vibration characteristic, wherein the current operational state is selected from at least two different operational states including at least one idle state and at least one working state.

In another embodiment, there is provided a system comprising one or more pieces of equipment comprising a motor and having a respective apparatus affixed, each respective apparatus comprising a sensor for detecting vibration, at least one first processor coupled to the sensor and configured to convert sensed vibration signals into the frequency domain to produce a vibration characteristic and determine a current operational state of the motor based on the vibration characteristic, wherein the current operational state is selected from at least two different operational states including at least one idle state and at least one working state, at least one memory for storing the determined operational states, and at least one second processor configured to, for at least one of the one or more pieces of equipment, process the stored determined operational states and establish a maintenance schedule for the respective piece of equipment.

In a further embodiment, there is provided a method of determining an operational state of a motor. The method comprises: sensing vibration generated by the motor; converting the sensed vibration into the frequency domain to produce a vibration characteristic; and determining a current operational state of the motor based on the vibration characteristic, wherein the current operational state is selected from at least two different operational states including at least one idle state and at least one working state.

Further features and advantages of embodiments will become apparent from the following description of embodiments of the invention, given by way of example only, which is made with reference to the accompanying drawings.

DETAILED DESCRIPTION OF CERTAIN INVENTIVE EMBODIMENTS

Figure 1:
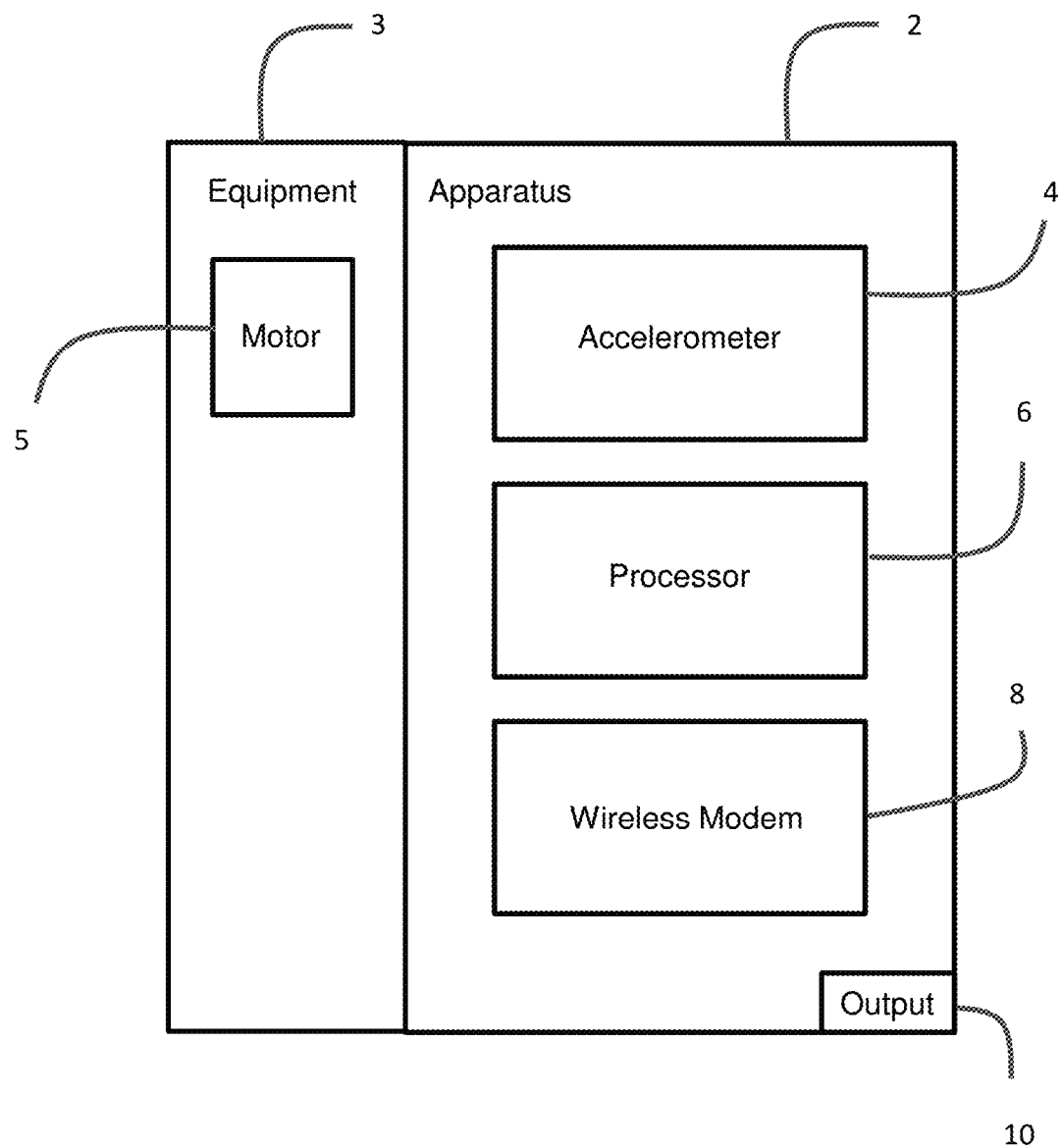
FIG. 1 shows a functional block diagram of an example of an apparatus according to an embodiment of the invention.

It is desirable to detect reliably the operational state of a motor regardless of whether equipment is in motion or stationary, and in particular if a motor is in an idle operational state.

In accordance with one embodiment, there is provided an apparatus for fixation to equipment containing a motor and for determining an operational state of the motor. The apparatus comprises:

a sensor for detecting vibration;
a processor coupled to the sensor and configured to:
convert sensed vibration signals into the frequency domain to produce a vibration characteristic and
determine a current operational state of the motor based on the vibration characteristic, wherein the current operational state is selected from at least different two operational states including at least one idle state and at least one working state.

The motor can be anything capable of carrying out mechanical work. For example the motor can be an electric motor or an internal combustion engine. An idle state can be a state in which the motor is running but carrying out no operational function for the equipment. If the motor is an internal combustion engine, the idle state corresponds to when the internal combustion engine is idling. The idle state can also be defined as when a motor is running but the equipment is not being used. For example, the motor of an air compressor is in an idle state when the air compressor is on but no air is being compressed, this may be the case when the air compressor motor is running but the air reservoir is at working pressure and no additional air is being compressed. The number of operational states and the way in which they are defined will depend on the particular equipment to which the apparatus is fixed.

Apparatus to monitor machine faults and condition over time using measured vibration have been proposed. Examples include:

WO-02/45407 A2, which discusses using an accelerometer to measure vibration and calculating a root mean square (rms) value representative of acceleration forces. The rms values are recorded in "bins" of amplitude values to provide a record of operational history.

EP-0529786 A2, which relates to detecting knocking in an internal combustion engine. The output of a wideband transducer is analysed to extract sensed signal energy (in terms of rms values) and spectral features (by calculating an autocorrelation function). When the sensed energy and spectral features exceed adaptively predetermined energy and spectral thresholds an event, such as knocking, is detected.

U.S. Pat. No. 5,566,092, which discusses a machine fault diagnostic system. A neural network is used to interpret sensed data. Estimated spectrums from a vibration signal by using a Fast Fourier Transform (FFT) can be used.

None of these documents suggest determining a current operational state of a motor, which includes determining an idle state. Apparatus to detect an engine state has also been proposed:

JP-2009/191820 discusses reduction of vibration for vehicles by controlling idle speed. Idling of a vehicle is detected when an accelerator opening is zero degrees and a vehicle speed sensor gives zero as the travel speed.

WO-2005/080779A1 discusses detecting whether a vehicle engine is running or stopped; a power supply is connected only when the engine is running. A frequency range of vibrations present both when the motor is idle and when the vehicle is moving is used to detect if the motor is stopped or running.

The applicant has recognized that knowledge of when a motor is in an idle state and a working state can have benefits including reduced energy use. For example, equipment which has a motor idle for long periods of time can be identified and steps taken to reduce this, possibly by training the operative to turn the equipment off between uses or by automatic action to turn the equipment off. Although motors are commonly used in vehicles, motors can also be used in equipment which remains stationary while the motor is doing work (the equipment may or may not be a vehicle itself). Thus, it is useful to be able to distinguish between whether an operational motor is idle or is doing work in a way that is not limited to detecting motion.

Some equipment may include more than one motor. The same principles described above can in that case be applied to all or some of the motors either independently or in any combination. For example, if equipment contains three motors, the operational states of one or more motors or all three motors could be determined independently (for example because the vibration characteristic of each motor will be different). The state of two or more, or all three, motors could also be determined in combination (for example using a vibration characteristic which reflects the combination of the operational states of the motors to be determined).

The apparatus may further comprise a transmitter. The transmitter can be used to transmit information of the current operational state. This enables analysis of the operational state at a location remote from the monitored equipment. The transmitter can be a wireless modem in some embodiments, for example a modem enabling transmission of data over a wireless network.

While the current operational state can be transmitted every time it is determined, this may require transmission several times a minute. The number of transmissions required, and hence the use of the transmitter, can be reduced in several ways. The processor may be further configured to transmit a history of the determined operational state of the motor using the transmitter at predetermined intervals. For example, the processor may transmit data every hour or any other repeating time period which summarizes the operational states over that time period. Alternatively, the processor can be further configured to transmit the determined operational state of the motor using the transmitter when the determined operational state changes. In this case, data is only transmitted when there is new information on the operational state, repeated transmission of the same operational state is avoided.

The apparatus can further comprise an output and the processor is configured to change the state of the output when it is determined that the motor has been in an idle state for a predetermined time. This can allow automatic actions to take place when a motor is detected as idle. For example the output may be used to give an alert to a user of the equipment, such as an audio or visual alert, or the output may be used to automatically turn off the equipment. This can help to reduce idle time and energy usage.

The processor can be configured to determine the current operational state in a variety of ways. The choice of which is used will depend on the characteristics of the equipment being monitored.

The processor can be configured to:
calculate the total power in the sensed vibration signal; and
determine the current operational state based on the total power and the vibration characteristic.

The total power can provide useful further information on the engine state to enable a more reliable determination of the engine state by using it in combination with the vibration characteristic. For example, the total power is likely to be lower when the motor is in an idle state than when the motor is working.

The processor can be further configured to divide the converted frequency domain signal into predetermined frequency ranges. This can simplify analysis. For example the frequency domain signal may be split into predetermined frequency ranges. When a Fast Fourier Transform (FFT) is used, these frequency ranges can be referred to as "bins". However, other methods of conversion into the frequency domain can also be used. The term "frequency range" is intended to cover a range from a first frequency to a second frequency. It may be directly output as a single figure by the conversion into the frequency domain or it may be calculated by summing two or more consecutive outputs from the conversion into the frequency domain (for example two or more frequency bins output by an FFT). This can be combined with other processing and/or analysis of the sensed vibration signal to improve the reliability with which the operational state is determined. For example, if it is combined with the total power in the sensed vibration signal the reliability of determining the operational state is generally higher than either technique in isolation.

The processor can be further configured to:

sum energy in selected ones of the predetermined frequency ranges; and determine the current operational state by comparing the summed energy to at least one predetermined threshold.

This enables an operational state to be determined when a particular operational state is associated with energy only in selected ones of the predetermined frequency ranges. The selected ones of frequency ranges can have frequency ranges which do not include frequencies present in the idle state thereby enabling a non-idle operational state to be determined, because if energy is present at those frequencies it implies that the motor is not idle.

The processor can be further configured to:

calculate the average energy across the all of predetermined frequency ranges;

compare the energy in least one of the predetermined frequency ranges to the average energy; and determine that the current operational state is an idle state when the energy in the at least one of the predetermined frequency ranges is larger than the average energy.

The average energy can be the arithmetical mean but other methods can also be used, for example root mean square. This allows the idle to be detected by looking for a frequency range with higher than average energy. The frequency ranges which are compared to the average may be predefined to correspond to the frequencies at which vibrations are generated when the motor is idle.

The processor can be further configured to:

accumulate the energy in the predetermined frequency ranges over a period of time;

identify which of the predetermined frequency ranges have the highest accumulated energy; and use the identified predetermined frequency ranges to determine whether the motor is in an idle state.

This allows the apparatus to adapt to different equipment. Over time, the energy will accumulate in frequency ranges associated with an idle state and these can then be easily identified by comparison with the others. To improve the accuracy, the accumulation may take place during an initial period in which the motor is more likely to be idle to reduce the effect of other frequencies present when the motor is doing work.

The predetermined frequency ranges can be predetermined according to a type of equipment. This allows the apparatus to be adapted to different types of equipment in a simple manner. The type of equipment can be, for example, a plant machinery type and/or a vehicle type. It can be possible for a user to select the type of equipment to make initial setup of the apparatus simpler.

There can be any number of operational states of the motor, but when there are at least three operational states of the motor, the processor can be further configured to determine the current operational state using information of the immediately previous operational state. This can allow introduction of logic that the motor cannot instantaneously change from one state to any of the others and in practice it is likely to move through operational states in a predictable manner. An example of this is that a motor off state can only be followed by a motor start state.

Determining the current operational state of the motor can also use information of likely state transitions between different ones of the operational states. The processor can be configured to execute a calibration process to determine the information of likely state transitions. The precise probability and number of the likely state transitions will vary depending on the current state, in some examples, a likely state transition may be one which occurs in more than 20% of transitions from a current state, more than 30%, more than 40%, more than 50%, more than 60%, more than 70%, more than 80% or more than 90%. In one example, the likely state transitions can correspond to valid state transitions, although it is not necessary for the likely state transitions to only correspond to valid state transitions (a user may operate a motor in a way which is unpredictable) or for all valid state transitions to be reflected in the likely state transitions (some valid state transitions may occur very rarely).

The processor can execute a calibration process to determine the respective vibration characteristic of the at least two different operational states. This can allow the apparatus to adapt automatically to the specific vibration characteristics of different equipment.

The apparatus may further comprise a receiver for receiving updates of operational instructions configuring the processor. The receiver may be, for example, a wireless data receiver. This can allow updates of the operation of the processor remotely. For example the predetermined frequency ranges can be changed, or other aspects of the way the current operation state is identified can be changed. The receiver can for receiving updates specific to a type of the equipment. The type of the equipment may be a specific or generic type of equipment, for example a specific model or equipment of a generic type, such as an air compressor.

In another embodiment, a system is provided which comprises at least one apparatus as described above, with or without the additional features also described, and at least one memory for storing the determined operational states. The memory can be a database. This enables a history the operational state to be stored for later analysis and reporting. For example, the idle time of equipment used by different operatives may be compared to identify operatives that would benefit from training to turn equipment off when not being used.

The system can comprise one or more pieces of equipment comprising at least one motor and having a respective apparatus as discussed above (with or without the optional features also described) affixed; and at least one processor configured to, for at least one of the one or more pieces of equipment, process the stored determined operational states and establish a maintenance schedule for the respective piece of equipment The maintenance schedule can relate to the timing of routine maintenance work, for example when particular servicing actions should take place. The maintenance schedule can relate to the piece of equipment in whole or in part. For example, it can relate to the entire piece of equipment or only elements of it which are associated with the motor.

Establishing a maintenance schedule can give a different weighting to the at least one idle state than to the at least one working state. For example time in the at least one working state may contribute to the maintenance schedule at a first rate and time in the at least one idle state may contribute to the maintenance schedule at a second rate. The second rate can be smaller than the first rate.

Where the system is configured to determine the operational state of more than one motor, a separate maintenance schedule can be established for elements of the piece of equipment which are associated with each motor or a combined maintenance schedule can be established considering elements of the piece of equipment which are associated with two or more motors together.

Other embodiments can process sensed vibration signals, determined operational states or vibration characteristics remotely from the device, for example at a central server or other back office computing system. According to one of these embodiments, a system comprises a receiver for receiving data of determined operational states of a motor associated with a piece of equipment, wherein the determined operational states are selected from at least two operational states including at least one idle state and at least one working state; and at least one processor configured to process the determined operational states and establish a maintenance schedule for the piece of equipment. According to another of these embodiments, a system comprises a receiver for receiving data of sensed vibration, wherein the vibration is generated by a motor; and at least one processor configured to execute a calibration process to determine information of likely state transitions between different ones of at least two operational states of the motor including at least one idle state and at least one working state. According to another of these embodiments, a system comprises a receiver for receiving data of sensed vibration, wherein the vibration is generated by a motor; and at least one processor configured to execute a calibration process to determine the respective vibration characteristic of at least two different operational states of the motor including at least one idle state and at least one working state.

In another embodiment, there is provided a method of determining an operational state of a motor, the method comprising:

sensing vibration generated by the motor;
converting the sensed vibration into the frequency domain to produce a vibration characteristic; and
determining a current operational state of the motor based on the vibration characteristic, wherein the current operational state is selected from at least two different operational states including at least one idle state and at least one working state.

The method may further comprise:
calculating the total power in the sensed vibration signal;
and wherein the determining the current operational state is based on the total power and the vibration characteristic.

The method may further comprise, before the determining:
dividing the frequency domain signal into predetermined frequency ranges.

The method may also further comprise, before the determining:
summing energy in selected ones of the predetermined frequency ranges;
and wherein, in the determining, the current operational state is determined by comparing the summed energy to at least one predetermined threshold.

The selected ones of the predetermined frequency ranges can have frequency ranges which do not include frequencies present in an idle state, thereby enabling a non-idle operational state to be determined.

The method can also further comprise, before the determining:
calculating the average energy across all of the predetermined frequency ranges; and
comparing the energy in least one of the predetermined frequency ranges to the average energy;
and wherein, in the determining, it is determined that current operational state is an idle state when the energy in the at least one of the predetermined frequency ranges is larger than the average energy.

The method can also further comprise, before the determining:
accumulating the energy in the predetermined frequency ranges over a period of time; and identifying which of the predetermined frequency ranges have the highest accumulated energy;
and wherein the identified predetermined frequency ranges are used in the determining to determine whether the current operational state is an idle state.

The predetermined frequency ranges can be based on a type of the equipment. The type of the equipment can be user selectable.

There can be at least three operational states of the motor, and the determining the current operational state can use information of the immediately previous operational state.

The determining the current operation state can use information of likely state transitions between different ones of the operational states.

The method can further comprise executing a calibration process to determine the information of likely state transitions between different ones of the operational states.

The method can further comprise executing a calibration process to determine the respective vibration characteristics of the at least two different operational states.

The method can further comprise storing the determined operational state; and establishing a maintenance schedule by processing a plurality of stored determined operational states.

In a further embodiment, there is provided a computer program product comprising instructions for execution by a processor which are embodied on a non-transitory computer readable medium, wherein when the instructions are executed by the processor, they instruct the processor to perform the method as described above, with or without one or more of the optional features also described.

FIG. 1 shows a functional block diagram of an apparatus 2 according to an embodiment. The apparatus 2 comprises an accelerometer 4, a processor 6, a wireless modem 8 and an output 10. In some embodiments the output 10 is omitted.

In use the apparatus 2 can be fixed or attached to a piece of equipment 3 which includes a motor 5. The fixation or attachment can be by any suitable means, some non-limiting examples include a mechanical attachment such as bolts or screws, adhesive fixation and zip or cable ties. The motor may be anything capable of carrying out mechanical work. For example the motor can be an electric motor or an internal combustion engine.

The accelerometer 4 outputs acceleration in three mutually orthogonal coordinates, the Cartesian coordinates x, y and z in this embodiment. In other embodiments the accelerometer may output acceleration in one or two directions only, and may include one or more measurements of rotational acceleration around the coordinate axes. An example of a suitable accelerometer is the LIS3DHTR, commercially available from ST Micro.

The processor 6 is a microcontroller in this embodiment. An example of a suitable microcontroller is the MSP430 Series commercially available from Texas Instruments. In other embodiments any processor capable of processing data may be used, including but not limited to an Application Specific Integrated Circuit, a Field Programmable Gate Array, a general purpose central processing unit, system on chip or a system in package. The processor 6 receives time domain measurements of acceleration from the accelerometer 4. In this embodiment the time domain measurements are digitized within the accelerometer 4 and provided in digital form to the microcontroller. In other embodiments the time domain measurements may be provided in analogue form to the microcontroller 6 and sampled using an Analogue to Digital Convertor (ADC) external to or provided within the microcontroller 6.

In this embodiment the accelerometer 4 provides samples of the acceleration in the x, y and z axes to the processor 6 at a rate of 100 Hz to allow vibration at frequencies up to 50 Hz to be recorded. The sample rate can be varied depending on the frequencies which are required for example higher or lower sample rates may be used. The sampling rate can also be increased if oversampling of the vibration is desired. Harmonic frequencies will also be present in the vibration. If it is desired to measure these harmonics directly the sampling rate can be increased. However, even without a higher sampling rate the harmonics will be present as aliasing in the sampled signal and will therefore give a measurable effect that can assist in characterizing an operation state.

The processor 6 processes the samples provided by the accelerometer 4 to determine the operational state of the motor within the equipment to which the apparatus 2 is attached. This processing is described in more detail below.

The operational state of the motor is transmitted using the wireless modem 8. The wireless modem 8 can function as both a transmitter and a receiver. In this embodiment the wireless modem is a GE865 commercially available from Telit, although in other embodiments any suitable wireless modem may be used for example one using wireless optical, for example infrared, or radio transmission, for example one complying to the IEEE 802.11 family of standards, the GSM or ITU standards for data transmission. In other embodiments, the wireless modem 8 may operate only as a transmitter.

The rate at which the determined operational state is transmitted is less than the sampling rate of the accelerometer. In one embodiment a transmission of the determined operational state is made every 1, 2, 3, 4 or 5 seconds. Other periods of time can also be used. In other embodiments, the wireless modem 8 may transmit history data of the operational state at periodic intervals. For example, a history of the operational state may be transmitted every hour, two hours, or any other period of time. Longer periods reduce use of the transmitter and can reduce power consumed by the apparatus and minimize use of wireless bandwidth. The history can comprise information of the operational states over the time period and the times associated with those operational states. The times can be expressed as an actual time, for example in terms of a date and time at which that operational state started and finished, or more simply in terms of the time in that operational state over the time period. In further embodiments, the operational state is transmitted only when the operational state changes to minimize use of data bandwidth when there is no change in the operating state.

By including the processor 6 and the wireless modem 8 in the apparatus, the processing of the sensed vibration signal to determine the operation state is carried out on board the apparatus. This can lead to a significant reduction in the data bandwidth required because it is not necessary to transmit every set of measured data for processing externally from the apparatus.

As well as transmitting the determined operational state, the wireless modem can also receive instructions to reconfigure the processor 6. For example the instructions may reconfigure the way in which the processor 6 processes the output of the accelerometer 4 to determine the current operating state.

The output 10 can be an electrical output which can be connected to external devices or systems. For example, the output 10 can be connected to a notification device such as a light and/or a buzzer to give a visual and/or audible notification to a user of the equipment. Alternatively or in addition, the output 10 can be connected to the motor controller of the equipment to which the apparatus 2 is attached, for example an engine management system of an internal combustion engine. In use, the processor 6 monitors the time that operational state is determined as idle. When the time exceeds a predetermined period, for example 5 minutes or any other suitable period, the output 10 can be activated to alert a user to turn the equipment off or to automatically turn the equipment off via the motor controller.

Figure 2:
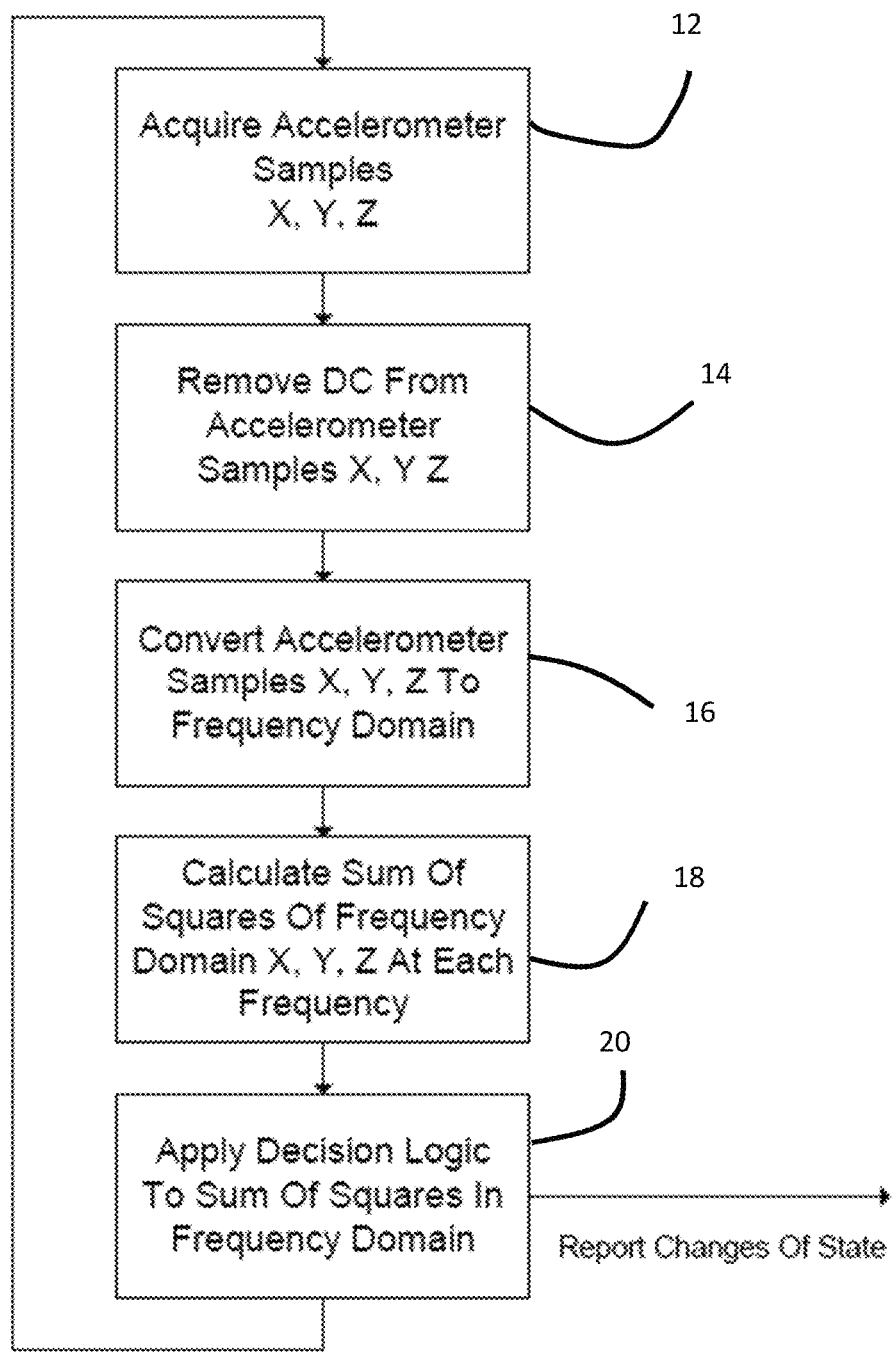
FIG. 2 is a flow chart of a method for reporting changes of the operation state of a motor according to an embodiment of the invention.

The operation of the processor 6 to determine the operational state of the motor in the equipment to which the apparatus is attached will now be described with reference to FIG. 2.

Initially, at step 12, the processor acquires the accelerometer samples for each of the x, y and z axes. A number of samples are acquired in each axis to give a representation of the vibration of the equipment over a period of time, for example 1 second or any other suitable period.

At step 14, the DC offset is removed from the accelerometer samples, this is necessary to remove the effect of gravity, which is present as a continuous DC offset. There is no requirement for the apparatus to be mounted on the equipment in any particular orientation so it cannot be assumed that the DC offset will only be present in the z direction. The DC offset can be calculated from an initial calibration when the apparatus has been attached to equipment, or from an analysis of each set of accelerometer samples.

Next, at step 16, the accelerometer samples in each of the x, y and z directions are converted into the frequency domain, for example by using a Fast Fourier Transform.

The sampled signal is now in the frequency domain and represents the spectrum of frequencies present in the measured vibration. At step 18, the frequency domain measurements from the x, y and z axes are combined into a single frequency spectrum and divided into predetermined frequency ranges. For example, in an embodiment the spectrum from 0 to 3000 rpm (50 Hz) can be divided in 64 equal frequency ranges. Within each frequency range the combined spectrum is calculated by summing the square of the value in each of the x, y and z directions.

Finally, at step 20, the combined frequency spectrum, expressed in terms of the predetermined frequency ranges is processed to determine the operational state. If the operational state has changed it is transmitted (although any of the other methods of reporting operational state discussed above can also be used) and execution returns to the beginning at step 12 to process the next set of samples.

Figure 3:
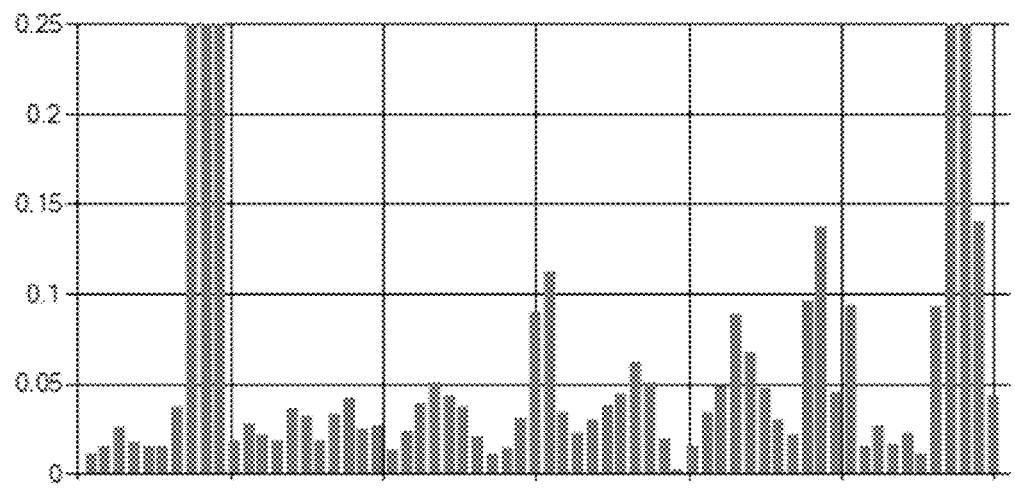
FIG. 3 depicts an example frequency spectrum of a motor in an idle state.
Figure 4:
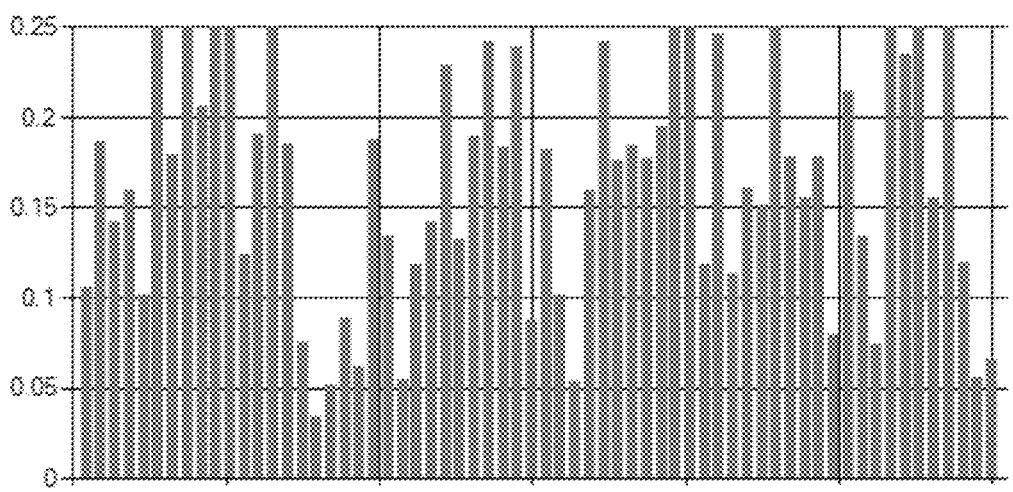
FIG. 4 depicts an example frequency spectrum of a motor in a working state.

Examples of the results of this processing can be seen in FIGS. 3 to 8. FIG. 3 depicts an example of a single spectrum which results from analyzing vibrations of a motor in an idle state. The horizontal axis represents frequency and each of the bars is one of the predetermined frequency ranges. In this example the frequency extends from 0 to 3000 rpm (50 Hz), although embodiments of the invention are not limited to this range. The vertical axis represents magnitude of that frequency range. It can be seen that there are two large peaks in the spectrum. FIG. 4 depicts a single spectrum when vibrations of a motor are analyzed while the motor is in a working state. It can be seen there is now a much broader distribution of peaks in the spectrum.

FIGS. 5 to 8 are two dimensional representations of the spectrums against time. The vertical axis represents frequency and the horizontal axis is time. The shading represents the values of the spectrum at each point in time. The differences in operational states can immediately be recognized from FIGS. 5 to 8. FIGS. 5A, 5B and 5C depict measurements of a chipper, FIGS. 6A-6C depict measurements of a crusher, FIGS. 7A-7C depict measurements of an excavator and FIGS. 8A-8C depict measurements of a loader. By comparison of FIGS. 5 to 8 it can be seen that each type of machine has a different frequency characteristic for both idle and working states. Furthermore, some types of equipment may have three or more operational states.

Figure 5A:
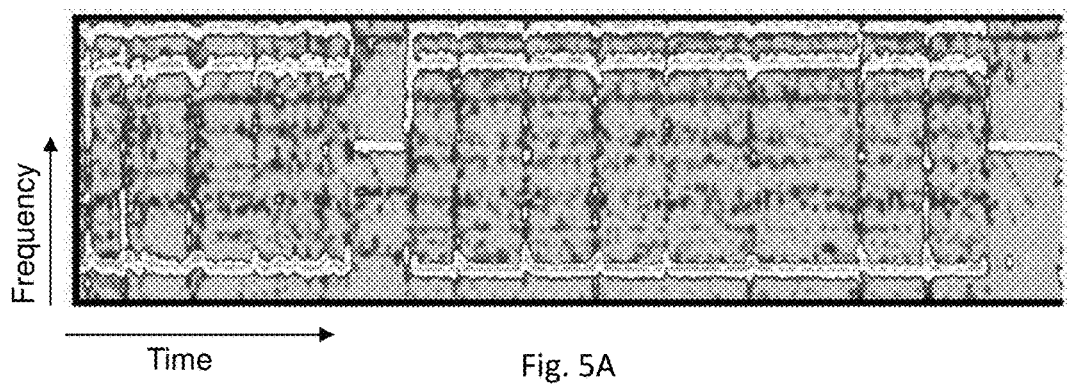
FIG. 5A depicts frequency spectrum against time for a chipper with a motor in a first operation state.
Figure 5B:
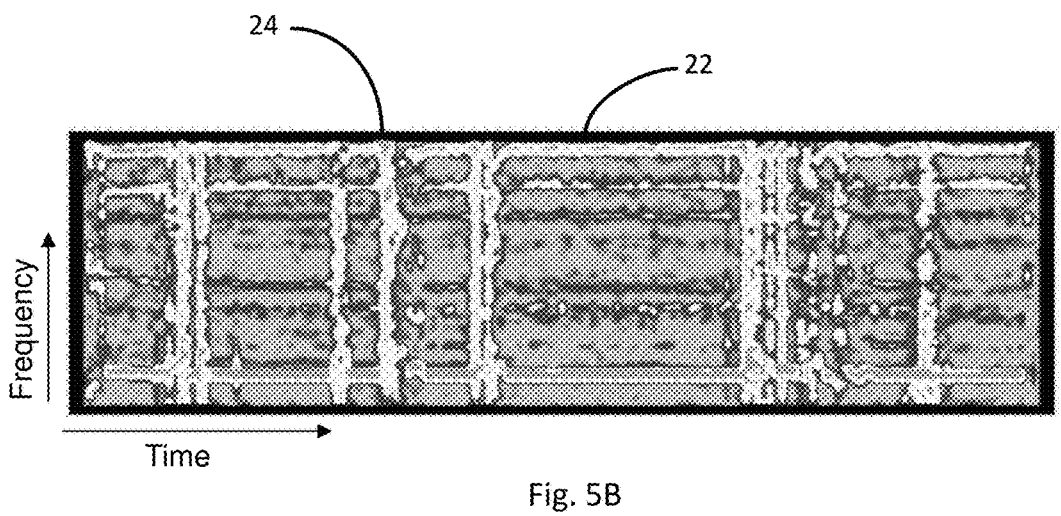
FIG. 5B depicts frequency spectrum against time for a chipper with a motor in a second operation state.
Figure 5C:
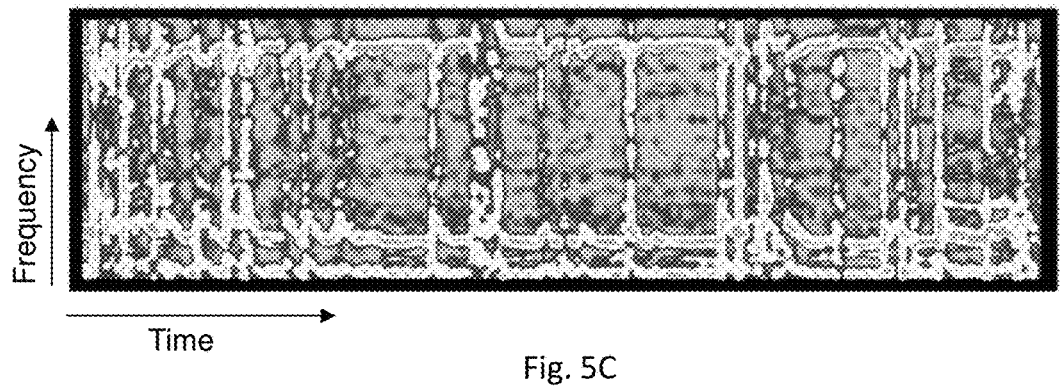
FIG. 5C depicts frequency spectrum against time for a chipper with a motor in a third operation state.

Referring to FIGS. 5A-5C, it can be seen that the spectrum has generally idle areas 22, in which the spectrum is concentrated in a small range of frequencies interrupted by short periods of operation 24 in which the spectrum has components more evenly spread across all frequencies.

Figure 6A:
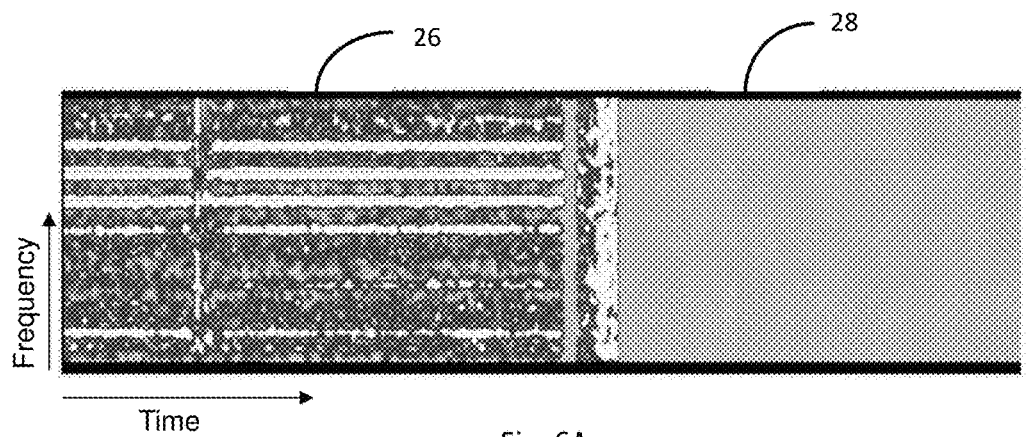
FIG. 6A depicts frequency spectrum against time for a crusher with a motor in a first operation state.
Figure 6B:
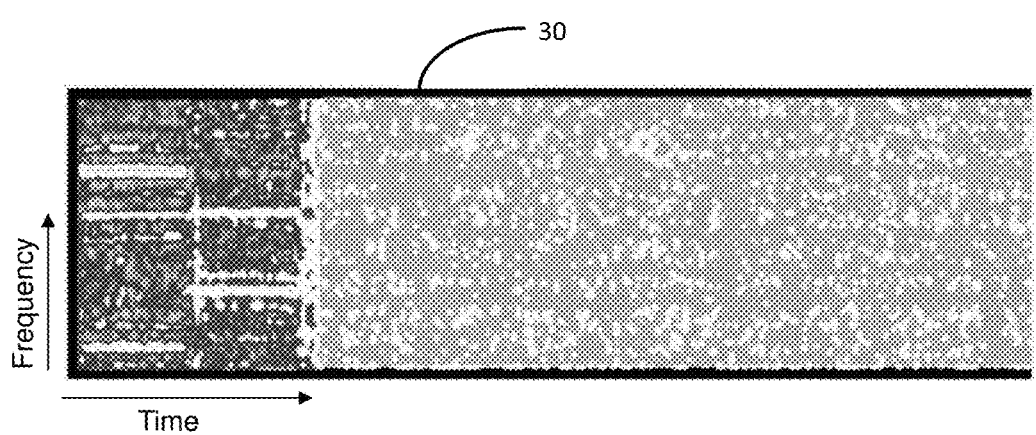
FIG. 6B depicts frequency spectrum against time for a crusher with a motor in a second operation state.
Figure 6C:
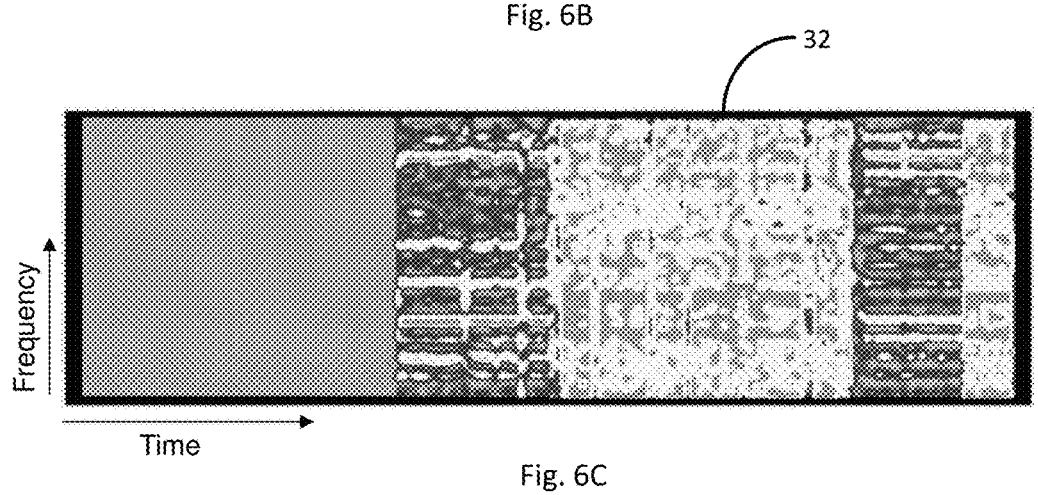
FIG. 6C depicts frequency spectrum against time for a crusher with a motor in a third operation state.
Figure 7A:
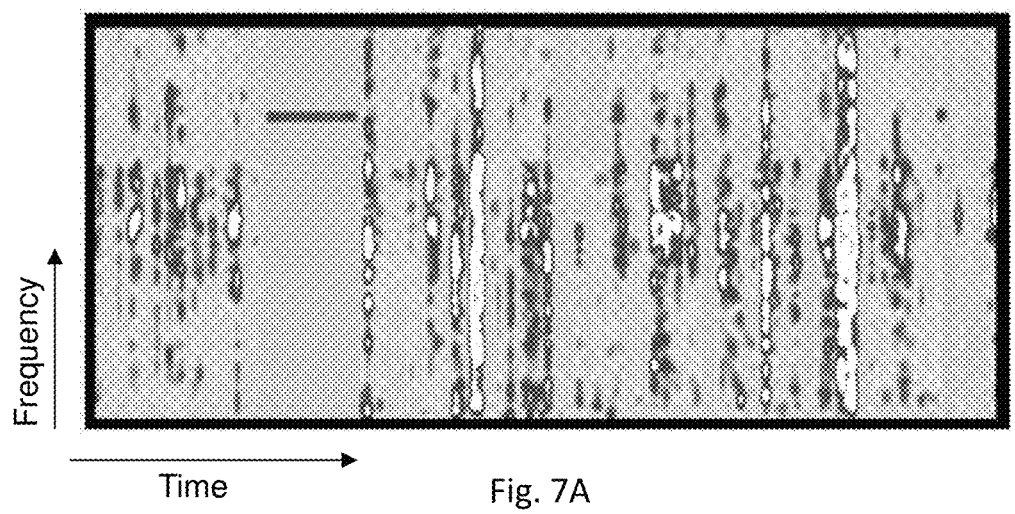
FIG. 7A depicts frequency spectrum against time for an excavator with a motor in a first operation state.
Figure 7B:
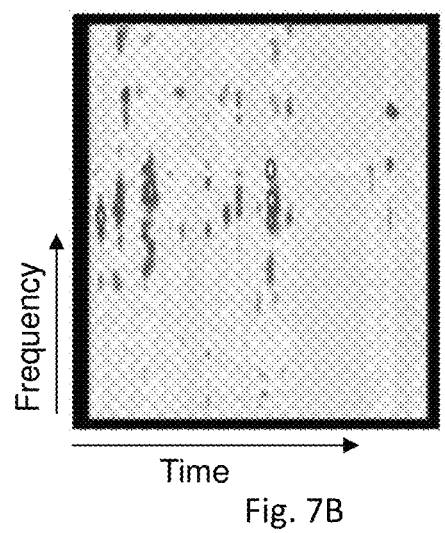
FIG. 7B depicts frequency spectrum against time for an excavator with a motor in a second operation state.
Figure 7C:
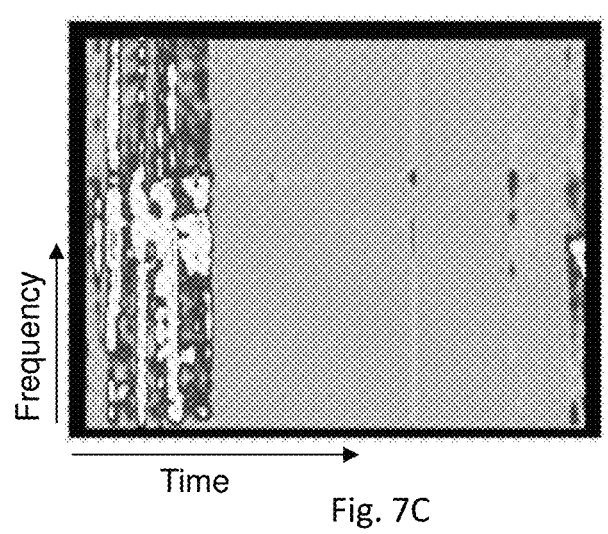
FIG. 7C depicts frequency spectrum against time for an excavator with a motor in a third operation state.
Figure 8A:
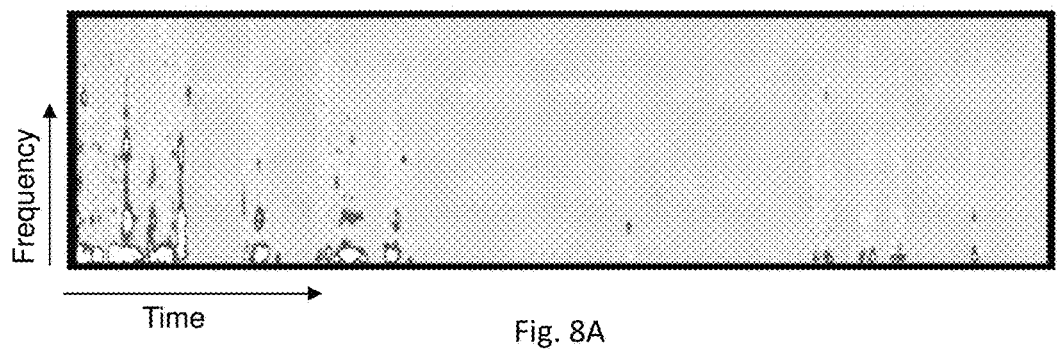
FIG. 8A depicts frequency spectrum against time for a loader with a motor in a first operation state.
Figure 8B:
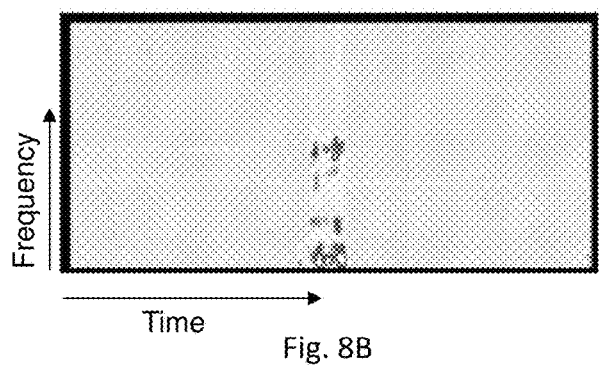
FIG. 8B depicts frequency spectrum against time for a loader with a motor in a second operation state.
Figure 8C:
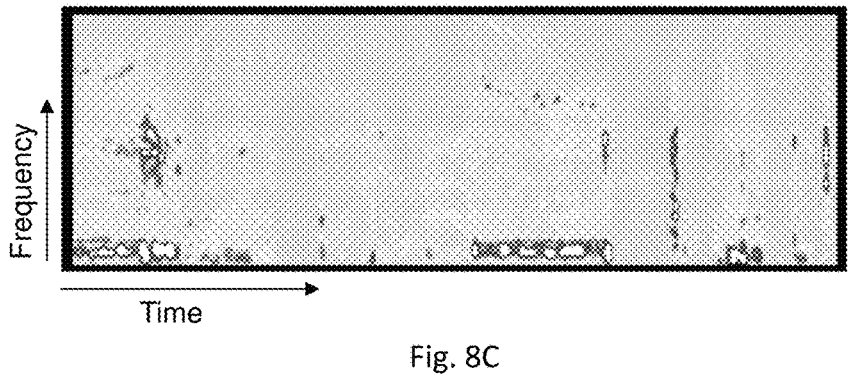
FIG. 8C depicts frequency spectrum against time for a loader with a motor in a third operation state.

FIGS. 6A-6C depict generally idle areas 26 for the crusher, where the spectrum is concentrated in a small range of frequencies which are not the same as idle areas 22 for the chipper. The spectrum also shows three other areas 28, 30 and 32 representing different working states, for example crushing different material, where the spectrum is more evenly spread across the frequency ranges. In some embodiments, these working states may be amalgamated and simply determined as a single working state. In other embodiments these states may be differentiated between and determined as different working states.

FIGS. 7 and 8 demonstrate how again the idle and working states are different for an excavator and a loader.

There are various methods that can be used for the processing in step 20 to determine an operating condition of a motor. Some of these methods rely on predefined parameters characterizing the equipment to which the apparatus is attached, others are adaptive or learning to allow use with arbitrary equipment and not require predefining parameters. Some examples of how this decision can be made will now be described.

Equipment types for which operation states may be required to be determined can be broken down into several categories:

Equipment that is stationary when idle and moves when working e.g. a skid steer loader. Some of this equipment is track-laying.

Equipment that can be stationary but moves substantially on the spot while working e.g. back-hoe digger.

Equipment that is stationary and changes its motion characteristics substantially between idle and working e.g. a horizontal hole borer.

Equipment that is physically stationary but changes only in its vibration frequency between idle and working, e.g. an air compressor feeding a pneumatic drill or other device.

The various methods discussed below can be applied to at least one of these equipment types, as well as the more specific spectrum examples discussed above.

In one method the energy in a range of frequency bins excluding the frequencies in which idle frequencies are present are summed to characterize the broad band frequency of a working state. This can be compared to a programmable threshold to identify a working state or alternatively by differencing the idle and working state summed energies to separately determine the idle and working states of the equipment.

The frequency bin ranges are preferably programmable Over The Air such that equipment with substantially different vibration characteristics can be assessed for idle versus working state. For example, appropriate thresholds and frequency ranges can be used for each equipment type. Non-limiting examples of equipment types include:

Chipper
Back hoe loader
Hole borer
Asphalt layer
Vibrating road roller
Air compressor In some embodiments the apparatus is self-calibrating over an initial period of use and from this can determine the idle frequency for future use in determining the idle state of the equipment. The calibration algorithm can include, but not be limited to:

determination of an engine-off state energy level averaged across all frequency bins that will typically be determined by the sensor system noise floor.

determination of engine start by presence of energy greater than the engine off state.

determination of the idle state by detecting the presence of a single frequency plus harmonics or aliases that are individually greater in magnitude than the average energy floor. Such detection can be implemented for example by normalising energy bins to the largest single energy bin value and expressing the peak to mean energy level as a ratio. The idle state would be assessed by the ratio being greater than a predetermined factor.

determination of slow idle and fast idle states by recording the prevalence of individual frequencies present using averaging means such as a histogram built up over time which would represent the idle frequencies that are habitually present. Slow idle and fast idle frequencies would build up within the histogram and could be used for subsequent determination of idle periods. By using such methods the faster idle associate only with the warm up period of the engine (as against the formal fast idle state immediately prior to the work state) would be removed by the averaging process. Considering the total power present in the signal can also be useful to distinguish between slow and fast idle states.

determination of the states by observing the logical progression through various states, e.g. start; slow idle; fast idle; fast idle plus working; fast idle; slow idle stop. Note that different equipment types may show different progressions according to their design.

A calibration process enables the device to determine on its own the various equipment states without the need for intense back end processing for each equipment type or data transmission costs for over the air updates.

The above embodiments are to be understood as illustrative examples of embodiments of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus adapted to be fixed to equipment containing an internal combustion engine, the apparatus for determining an operational state of the internal combustion engine, the apparatus comprising:
    an accelerometer configured to measure vibration of the equipment in the time domain; and
    a processor coupled to the accelerometer, the processor being configured to:
        convert the measured vibration from the time domain into the frequency domain to produce a vibration characteristic;
        analyze the vibration characteristic to determine a current operational state of the internal combustion engine, the current operational state being selected from at least two different operational states including an idling state and a working state by:
            dividing the vibration characteristic into predetermined frequency ranges;
            calculating an average energy across the predetermined frequency ranges;
            comparing an energy in least one of the predetermined frequency ranges to the average energy; and
            determining that the current operational state is an idling state when the energy in the at least one of the predetermined frequency ranges is larger than the average energy,
        wherein the idling state is a state in which the internal combustion engine is turned on and idling, and
    provide an output based on the determined operational state.

2. The apparatus of claim 1, further comprising a transmitter, wherein the processor is configured to provide the output by transmitting the determined operational state of the internal combustion engine using the transmitter.

3. The apparatus of claim 2, wherein the processor is configured to provide the output by transmitting a history of the determined operational state of the internal combustion engine using the transmitter at predetermined intervals.

4. The apparatus of claim 2, wherein the processor is configured to provide the output by transmitting the determined operational state of the internal combustion engine using the transmitter when the determined operational state changes.

5. The apparatus of claim 1, further comprising an electrical output, wherein the processor is configured to provide the output by changing the state of the electrical output responsive to a determination that the internal combustion engine has been in the idling state for a predetermined time.

6. The apparatus of claim 1, wherein the processor is configured to:
    calculate a total power in the sensed vibration signal; and
    determine the current operational state based on the total power and the vibration characteristic.

7. The apparatus of claim 1, wherein the predetermined frequency ranges are based on a type of the equipment.

8. The apparatus of claim 1, wherein the processor is configured to execute a calibration process to determine the respective vibration characteristic of the at least two different operational states.

9. The apparatus of claim 1, further comprising a receiver configured to receive updates of operational instructions configuring the processor.

10. An apparatus adapted to be fixed to equipment containing an internal combustion engine, the apparatus for determining an operational state of the internal combustion engine, the apparatus comprising:
    an accelerometer configured to measure vibration of the equipment in the time domain; and
    a processor coupled to the accelerometer, the processor being configured to:
        convert the measured vibration from the time domain into the frequency domain to produce a vibration characteristic;
        analyze the vibration characteristic to determine a current operational state of the internal combustion engine, the current operational state being selected from at least two different operational states including an idling state and a working state by:
            dividing the vibration characteristic into predetermined frequency ranges;
            accumulating an energy in each of the predetermined frequency ranges over a period of time, thereby to determine an accumulated energy in each of the predetermined frequency ranges;
            identifying at least one predetermined frequency range which has an accumulated energy that is higher than an accumulated energy of another of the predetermined frequency ranges; and
            using the identified at least one predetermined frequency range to determine whether the current operational state is an idle state,
        wherein the idling state is a state in which the internal combustion engine is turned on and idling; and
    provide an output based on the determined operational state.

11. An apparatus for fixation to equipment containing an internal combustion engine and for determining an operational state of the internal combustion engine, the apparatus comprising:
    an accelerometer configured to measure vibration of the equipment in the time domain; and
    a processor coupled to the accelerometer, the processor being configured to:
        convert the measured vibration from the time domain into the frequency domain to produce a vibration characteristic;
        analyze the vibration characteristic to determine a current operational state of the internal combustion engine, the current operational state being selected from at least two different operational states including an idling state and a working state,
wherein the idling state is a state in which the internal combustion engine is turned on and idling; and
provide an output based on the determined operational state;
wherein there are at least three operational states of the internal combustion engine, the at least three operational states of the internal combustion engine including the idling state, the working state, and an internal combustion engine off state, and the processor is configured to determine the current operational state using (i) information of the immediately previous operational state and (ii) information of likely state transitions between different ones of the operational states.

12. A system comprising:
one or more pieces of equipment comprising an internal combustion engine and having a respective apparatus affixed, each respective apparatus comprising:
an accelerometer for measuring vibration of the equipment in the time domain;
at least one first processor coupled to the sensor-accelerometer and configured to:
convert the measured vibration from the time domain into the frequency domain to produce a vibration characteristic;
analyze the vibration characteristic to determine a current operational state of the internal combustion engine, the current operational state being selected from at least two different operational states including an idling state and a working state by:
dividing the vibration characteristic into predetermined frequency ranges;
calculating an average energy across the predetermined frequency ranges;
comparing an energy in least one of the predetermined frequency ranges to the average energy; and
determining that the current operational state is an idle state when the energy in the at least one of the predetermined frequency ranges is larger than the average energy;
wherein the idling state is a state in which the internal combustion engine is turned on and idling; and
provide an output based on the determined operational state;
at least one memory for storing the output; and
at least one second processor configured to, for at least one of the one or more pieces of equipment, process the stored output and establish a maintenance schedule for the respective piece of equipment.

13. The system of claim 12, wherein the at least one first processor or the at least one second processor is configured to execute a calibration process to determine the respective vibration characteristic of the at least two different operational states.

14. A method of determining an operational state of an internal combustion engine, the method comprising:
providing an apparatus adapted to be affixed to equipment, the equipment comprising the internal combustion engine, the apparatus comprising an accelerometer;
measuring, using the accelerometer, vibration generated by the internal combustion engine in the time domain;
converting, using a processor coupled to the accelerometer, the measured vibration from the time domain into the frequency domain to produce a vibration characteristic;
dividing, using the processor, the vibration characteristic into predetermined frequency ranges;
calculating, using the processor, an average energy across the predetermined frequency ranges; and
comparing, using the processor, an energy in least one of the predetermined frequency ranges to the average energy,
determining, using the processor, a current operational state of the internal combustion engine based on the comparing, the current operational state being selected from at least two different operational states including an idling state and a working state, wherein the current operational state is determined to be the idling state when the energy in the at least one of the predetermined frequency ranges is larger than the average energy,
wherein the idling state is a state in which the internal combustion engine is turned on and idling; and
providing, using the processor, an output based on the determined operational state.

15. The method of claim 14, further comprising:
storing, in a memory, the output; and
establishing a maintenance schedule, using the processor, by processing a plurality of stored output.

16. A method of determining an operational state of an internal combustion engine, the method comprising:
providing an apparatus adapted to be affixed to equipment, the equipment comprising the internal combustion engine, the apparatus comprising an accelerometer;
measuring, using the accelerometer, vibration generated by the internal combustion engine in the time domain;
converting, using a processor coupled to the accelerometer, the measured vibration from the time domain into the frequency domain to produce a vibration characteristic; and
determining, using the processor, a current operational state of the internal combustion engine based on the vibration characteristic, the current operational state being selected from at least two different operational states including an idling state and a working state,
wherein the idling state is a state in which the internal combustion engine is turned on and idling; and
providing, using the processor, an output based on the determined operational state;
wherein determining the current operational state uses information of likely state transitions between different ones of the operational states, the method further comprising executing, using the processor, a calibration process to determine the information of likely state transitions between different ones of the operational states.

* * * * *